United States Patent
Clidaras et al.

(10) Patent No.: US 10,211,630 B1
(45) Date of Patent: Feb. 19, 2019

(54) DATA CENTER WITH LARGE MEDIUM VOLTAGE DOMAIN

(71) Applicant: Google LLC, Mountain View, CA (US)

(72) Inventors: Jimmy Clidaras, Los Altos, CA (US); Cornelius B. O'Sullivan, Mountain View, CA (US); Anand Ramesh, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 393 days.

(21) Appl. No.: 14/040,381

(22) Filed: Sep. 27, 2013

Related U.S. Application Data

(60) Provisional application No. 61/706,617, filed on Sep. 27, 2012.

(51) Int. Cl.
*H02J 3/00* (2006.01)
*H02J 1/00* (2006.01)

(52) U.S. Cl.
CPC . *H02J 1/00* (2013.01); *H02J 3/00* (2013.01)

(58) Field of Classification Search
CPC .................................................. H02J 3/00
USPC ............................................................ 307/18
See application file for complete search history.

(56) References Cited

U.S. PATENT DOCUMENTS

| | | | | |
|---|---|---|---|---|
| 4,800,363 A | * | 1/1989 | Braun | H02J 13/0024 340/12.33 |
| 7,353,601 B1 | * | 4/2008 | Bertini | H02G 1/16 29/857 |
| 7,363,517 B2 | | 4/2008 | Bodas | |
| 7,492,057 B2 | * | 2/2009 | Baldwin | H02J 1/16 307/64 |
| 7,646,590 B1 | * | 1/2010 | Corhodzic | H05K 7/1492 361/622 |
| 7,851,950 B1 | * | 12/2010 | Morales | H05K 7/1492 307/147 |
| 8,378,530 B1 | * | 2/2013 | Morales | H05K 7/1492 307/147 |
| 8,464,080 B2 | | 6/2013 | Archibald et al. | |
| 8,595,515 B1 | * | 11/2013 | Weber | G06F 1/3206 713/300 |
| 8,638,008 B2 | * | 1/2014 | Baldwin | H02J 1/102 307/147 |
| 8,659,895 B1 | * | 2/2014 | Carlson | H05K 7/20745 361/694 |
| 8,836,175 B1 | * | 9/2014 | Eichelberg | G06F 1/30 307/147 |
| 8,902,569 B1 | * | 12/2014 | Wishman | G06F 1/26 307/87 |

(Continued)

FOREIGN PATENT DOCUMENTS

| | | |
|---|---|---|
| CN | 101799681 | 8/2010 |
| EP | 2301130 | 5/2009 |

(Continued)

*Primary Examiner* — Adi Amrany
(74) *Attorney, Agent, or Firm* — Fish & Richardson P.C.

(57) ABSTRACT

A method of providing power to computer systems in a computer data includes receiving high-voltage power from one or more electric utility distribution systems; transforming the high-voltage power to medium-voltage power; and distributing the medium voltage power through a common medium voltage domain that serves a plurality of medium voltage-to-low voltage converters that are located in rows of computer racks in the computer data center.

24 Claims, 7 Drawing Sheets

(56) References Cited

U.S. PATENT DOCUMENTS

| | | | | |
|---|---|---|---|---|
| 8,994,231 B1* | 3/2015 | Corhodzic | ............... | H01F 27/40 307/147 |
| 9,009,500 B1* | 4/2015 | Fan | ............... | G06F 1/26 713/300 |
| 9,098,278 B1* | 8/2015 | Nay | ............... | G06F 1/3206 |
| 2003/0079897 A1* | 5/2003 | Sempliner | ......... | E04F 15/02405 174/486 |
| 2004/0244310 A1* | 12/2004 | Blumberg | ............... | E04H 9/06 52/79.1 |
| 2006/0291575 A1* | 12/2006 | Berkman | ............... | H04B 3/54 375/257 |
| 2007/0217414 A1* | 9/2007 | Berkman | ............... | H04B 3/231 370/390 |
| 2008/0055846 A1* | 3/2008 | Clidaras | ............... | G06F 1/20 361/679.41 |
| 2009/0031148 A1* | 1/2009 | Densham | ............... | G06F 1/189 713/300 |
| 2009/0154159 A1* | 6/2009 | Graybill | ............... | F21K 9/00 362/249.02 |
| 2010/0262393 A1* | 10/2010 | Sharma | ............... | G01R 29/18 702/79 |
| 2010/0299548 A1* | 11/2010 | Chadirchi | ............... | G06F 1/263 713/340 |
| 2011/0006607 A1* | 1/2011 | Kwon | ............... | G06F 1/30 307/66 |
| 2011/0018704 A1* | 1/2011 | Burrows | ............... | H04B 3/54 340/538 |
| 2011/0063125 A1* | 3/2011 | Labate | ............... | G01D 4/004 340/870.02 |
| 2011/0169461 A1* | 7/2011 | Deaver, Sr. | ............... | G05F 1/70 323/209 |
| 2011/0279207 A1* | 11/2011 | Patel | ............... | G01R 15/181 336/65 |
| 2012/0022713 A1* | 1/2012 | Deaver, Sr. | ............ | G05B 17/02 700/298 |
| 2012/0030347 A1* | 2/2012 | Hsu | ............... | G06F 11/3006 709/224 |
| 2012/0077527 A1* | 3/2012 | Santiago | ............ | G05B 23/0224 455/466 |
| 2012/0119585 A1* | 5/2012 | Park | ............... | H02J 3/04 307/80 |
| 2012/0134090 A1* | 5/2012 | Peng | ............... | G06F 1/189 361/679.31 |
| 2012/0181869 A1* | 7/2012 | Chapel | ............... | H02J 9/06 307/64 |
| 2012/0226922 A1 | 9/2012 | Wang et al. | | |
| 2012/0279779 A1* | 11/2012 | Cottuli | ............... | H02G 3/185 174/660 |
| 2013/0031381 A1* | 1/2013 | Jau | ............... | H02J 7/0057 713/300 |
| 2013/0101055 A1* | 4/2013 | Pande | ............... | H04B 3/54 375/257 |
| 2013/0191664 A1 | 7/2013 | Archibald et al. | | |
| 2013/0273825 A1* | 10/2013 | Uno | ............... | H05K 7/20745 454/184 |
| 2014/0152109 A1* | 6/2014 | Kanakasabai | ............ | H02J 9/00 307/66 |
| 2014/0170951 A1* | 6/2014 | Ryu | ............... | H05K 7/20745 454/184 |
| 2015/0074431 A1* | 3/2015 | Nguyen | ............... | H02J 3/006 713/300 |

FOREIGN PATENT DOCUMENTS

| | | |
|---|---|---|
| WO | 2007/064485 | 6/2007 |
| WO | 2010/028028 | 3/2010 |
| WO | 2010/093549 | 8/2010 |
| WO | 2012/057729 | 5/2012 |
| WO | WO2011147047 A8 | 7/2012 |

* cited by examiner

DATA CENTER WITH LARGE MEDIUM VOLTAGE DOMAIN

CROSS-REFERENCE TO RELATED APPLICATIONS

This application claims priority to U.S. Provisional Application Ser. No. 61/706,617, filed on Sep. 27, 2012, entitled "Data Center With Large Medium Voltage Domain," the entire contents of which are hereby incorporated by reference.

TECHNICAL FIELD

This document relates to electrical power systems for computer data centers.

BACKGROUND

The popularity and simplicity of sharing information over networks, such as the Internet, has resulted in demand for data processing and storage capacity to support high network traffic volume. One mechanism to address this demand is the computer data center. A computer data center is a facility of one or more buildings in which are installed a large number (e.g., thousands, tens of thousands, or more) of computer servers that are connected to receive, process, and respond to requests from other devices connected to the Internet or other networks. For example, a computer data center may house server systems that respond to search requests, that provide email and similar services that stream music to registered users, and the like. Computer data centers may also be deployed in other contexts. Financial institutions, for example, may employ one or more computer data centers to store financial account and transaction information or to carry out trades with electronic markets.

The massive computing needs of a computer data center can lead to massive electric power requirements. For example, modern large computer data centers can demand tens of megawatts of electricity when operating, or even more. The cost of obtaining such large amounts of electricity can be very high, and the equipment needed to distribute the electricity to computer systems in the computer data center can be expensive and complex.

SUMMARY

This document describes systems and techniques that may be used to provide electric power to computer systems in a computer data center. As discussed herein, a computer data center is a large facility (having thousands of computer servers or more and associated hardware and support systems, such as electrical power and mechanical (e.g., HVAC) systems) in which a substantial majority of the computing resources are operated by or on behalf of a common entity— as distinguished from a co-location facility in which many organizations may share a facility but operate their own distinct computing hardware.

Particular examples discussed below relate to the provision of power through a large, common, medium voltage domain to a large number of relatively small low voltage domains. A domain as described here is an area in which electricity can flow freely, without being blocked by active components such as transformers, closed (i.e., conducting) switches, or other components that would prevent electrical current from flowing from a first area in the domain to a second area in the domain where the current is presently needed. For example, a single joined conductor of adequate capacity to handle expected current flow over and across a domain (perhaps including closed switches that are in a conducting mode), and having a single common voltage (through with expected minor spatial and transient variation) can be considered a common domain.

In certain examples described herein, a single common medium voltage domain can span a large amount of designed electric demand (e.g., 2-5 MW, 5-10 MW, 10-20 MW, 20-30 MW, or 30-50 MW) in a computer data center. (Unless noted otherwise, power levels recited here are for designed levels.) That means that a common pool of medium voltage electric power can serve racks of computer servers and other computer data center equipment that is designed to have a relatively large peak electric demand, such as more than 2 MW, more than 5 MW, more than 10 MW, more than 30 MW, or more (up to, e.g., 100 MW). The medium voltage domain can cover the entirety of a data center that houses thousands or tens of thousands of server systems, for example. In counting computers in this document, a single server or computer is considered to be a computer on a particular motherboard, generally occupying one slot in a rack, and may hold multiple microprocessors that each include multiple cores (which may each be executing multiple virtual machines).

The respective low voltage domains may be many in number and relatively small in size. For example, the average low voltage domain may cover a single-digit number of racks of computers (1 to 9) and fewer than 100 or fewer than 200 discrete motherboards of computers. For example, a medium voltage-to-low voltage converter may be mounted at the top of each rack or each bay in each row of racks in a data center, or above every nth rack, where each converter would then serve n racks (where n is an integer of value 1 or more). (A rack may be an individually movable collection of computer systems, and may include one or more vertical stacks, or bays, of computer server systems, such as 30 different computer motherboards that lay horizontally on trays that rest on shelves from a level near the floor to a level of about six feet to ten feet off the floor.)

As one example, a linear bus bar may be routed high above paired rows of racks that are positioned back-to-back so that their heated exhaust is captured in a warm air plenum behind the respective rows in the pair of rows. Human-occupiable aisles may be in front of the racks on each side of the paired rows, and the racks may be open to the aisles at their front faces so that air can flow freely from the workspace into the respective racks, pass over the electronic equipment (e.g., microprocessors) in the racks, and be routed into the common warm air plenum, at which point it can be exhausted to the outdoors, or can be cooled and re-circulated back into the workspace for another cycle. The medium voltage bus ducts may be located above the warm air aisle or over one of the rows of racks and can run parallel with (or, alternatively, perpendicular to) the rows of racks. Alternatively, the electrical distribution structures may be below a raised floor. The bus ducts may have conductive taps placed on them at particular locations along the row, where the taps may lead to the medium voltage-to-low voltage converters (e.g., transformers) that can be positioned at the top of each rack (or each nth rack) and may in turn provide power to power supplies that serve computer server systems mounted in the corresponding racks. For example, separate conductors (e.g., insulated cables) may drop down from the bus duct to individual medium voltage-to-low voltage converters positioned atop each rack, where low voltage power may exit the respective converter to power each of the computer servers in the rack. Such low voltage power may be carried from each converter to a corresponding power strip that runs vertically along a front corner of the corresponding rack. The strip may include female outlets into which may be plugged cords that serve particular ones of the computers in the rack.

By yet another measure (in addition to the medium voltage domain being large, or the low voltage domains being small), the medium voltage domain may also be a large area as compared to the size of the low voltage domains. For example, a single common medium voltage domain may serve 10 MW or more of power, while the average low voltage domain under the medium voltage domain may server 50 KW or less. In an alternative implementation, one medium voltage domain may serve two or more paired rows of racks (i.e., four total rows via two bus ducts) having five thousand computer motherboards in the four rows, and the average low voltage domain under that medium voltage domain may server 50 computer motherboards or less. Stated in a different manner for another implementation, one or more medium voltage domains may be provided for a data center and may each provide power to more than 100 medium voltage-to-low voltage converters.

Also described are mechanisms for providing on-site electrical power to such a data center facility—whether as primary power or back-up power. In particular, the power for such a large domain may need to be provided by a large number of power-generating sub-systems whose power is combined onto the large domain. Such sub-systems may include various forms of electric generator sets, such as engine-powered rotating generators, solar cells, fuel cells, etc. The power from such subs-systems may be created as DC power or may be converted from AC to DC power so that it may be combined easily, and also without having to synchronize the AC phase of the various generator sets. Such an approach can permit the generator sets to provide back-up power very quickly because there is no need for a relatively time-consuming phase synchronization process. Also, the generator sets may provide primary power and may be synchronized with each other across a large group of sets, so that their power may be easily combined onto a large electrical domain like those described here. The power may be further synchronized to a clock for the utility grid, so that any switchovers between the on-site power and the grid, or vice-versa, may be made quickly and reliably.

In one implementation, a method of providing power to computer systems in a computer data center is disclosed. The method comprises receiving high-voltage power from one or more electric utility distribution systems; transforming the high-voltage power to medium-voltage power; and distributing the medium voltage power through a common medium voltage domain that serves a plurality of medium voltage-to-low voltage converters that are located in rows of computer racks in the computer data center. The medium voltage-to-low voltage converters can be mounted to individual racks in the rows of racks, and each rack in a row of racks can have a medium voltage-to-low voltage converter mounted to it. Also, one or more bays in a first row of racks can be dedicated to medium voltage-to-low voltage converters that serve computer servers in the first row of racks. Moreover, the medium voltage-to-low voltage converters can be served from medium voltage bus bars located above respective rows of racks served by the medium voltage bus bars, or areas adjacent to the respective rows of racks. The method of claim 1, wherein the medium voltage-to-low voltage converters have low voltage outputs that are connected to power strips that run vertically along frames of particular racks in the rows of racks.

In some aspects, the common medium voltage domain is defined as an area of an electrical distribution system for the computer data center having a common voltage level and freedom of electric power to flow across the domain without block by active circuit elements. Also, each medium-voltage-to-low-voltage converter can be located between a first end and a second end of a respective row of computers that the medium-voltage-to-low-voltage converter serves, and/or located above a rack that the respective medium-voltage-to-low-voltage converter serves. The medium voltage domain can deliver more than ten megawatts at design capacity, as one example, and the average medium-voltage-to-low-voltage converter served by the single common medium voltage domain can deliver less than one megawatt at design capacity.

In yet other aspects, the medium voltage domain delivers more than thirty megawatts at design capacity, and the average medium voltage-to-low voltage converter of the medium voltage-to-low voltage converters served by the medium voltage domain delivers less than one megawatt at design capacity. In addition, the medium voltage domain can carry alternating current and the medium voltage-to-low voltage converters can comprise transformers. Alternatively or in addition, the medium voltage domain can carry direct current.

In another implementation, a system for providing power to computer systems in a computer data center is disclosed. The system comprises one or more converters arranged to convert high-voltage power from one or more electric utility distribution systems to medium-voltage power; a medium voltage domain that serves more than one row of racks in the computer-data center; and a plurality of medium voltage-to-low voltage converters arranged to received electric power from the medium voltage domain and to provide low-voltage electric power to a plurality of computing components in the computer data center, wherein the plurality of medium voltage-to-low voltage converters are located in rows of computer racks in the computer data center. The medium voltage-to-low voltage converters can be mounted to individual racks in the rows of racks, and each rack in a first row of racks can have a medium voltage-to-low voltage converter mounted to it. Also, one or more bays in a first row of racks can be dedicated to medium voltage-to-low voltage converters that serve computer servers in the first row of racks, and the medium voltage-to-low voltage converters can be served from medium voltage bus bars located above respective rows of racks served by the medium voltage bus bars, or in areas adjacent to the respective rows of racks.

In certain aspects, the medium voltage-to-low voltage converters have low voltage outputs that are connected to power strips that run vertically along frames of particular racks in the rows of racks. Also, the common medium voltage domain can be defined as an area of an electrical distribution system for the computer data center having a common voltage level and freedom of electric power to flow across the domain without block by active circuit elements. Moreover, each medium-voltage-to-low-voltage converter can be located between a first end and a second end of a respective row of computers that the medium-voltage-to-low-voltage converter serves, and each medium-voltage-to-low voltage converter can be located above a rack that the respective medium-voltage-to-low-voltage converter serves.

Other features and advantages will be apparent from the description and drawings, and from the claims.

DETAILED DESCRIPTION

This description discusses systems and techniques for distributing power at different voltage levels in a computer data center. In general, electric power may enter the computer data center facility from a utility at a HV level, and may be reduced to medium voltage by one or more substations on the grounds of the computer data center facility. Medium voltage power may then be distributed into the actual physical building of the computer data center or may be stepped down to low voltage and distributed into the building of the data center. Where medium voltage power is distributed into the building of the data center, the amount of the distribution system that is medium voltage for the system described here may be considered to be larger than is true in a typical installation because a more extensive portion of the distribution system will be at a medium voltage level. Also, where larger portions of the medium voltage level of the distribution center are tied together conductively so that power can move freely from one area of that medium voltage level to the other areas, the areas are considered to be part of a single medium voltage domain. For example, bus ducts that serve rows of computer racks in the data center and run essentially the entire length of the rows of computer racks may carry medium voltage power rather than low-voltage power. The medium voltage power may then be fed to converters at the rack level that convert the power to low voltage, and then pass it to power supplies at each tray level or at the rack level. For example, each tray holding a motherboard may also hold a power supply for supplying power to the motherboard, or a bay in the row of racks may be dedicated to holding power supplies that are then connected laterally and electrically to motherboards located on each side of such a bay.

Figure 1A:
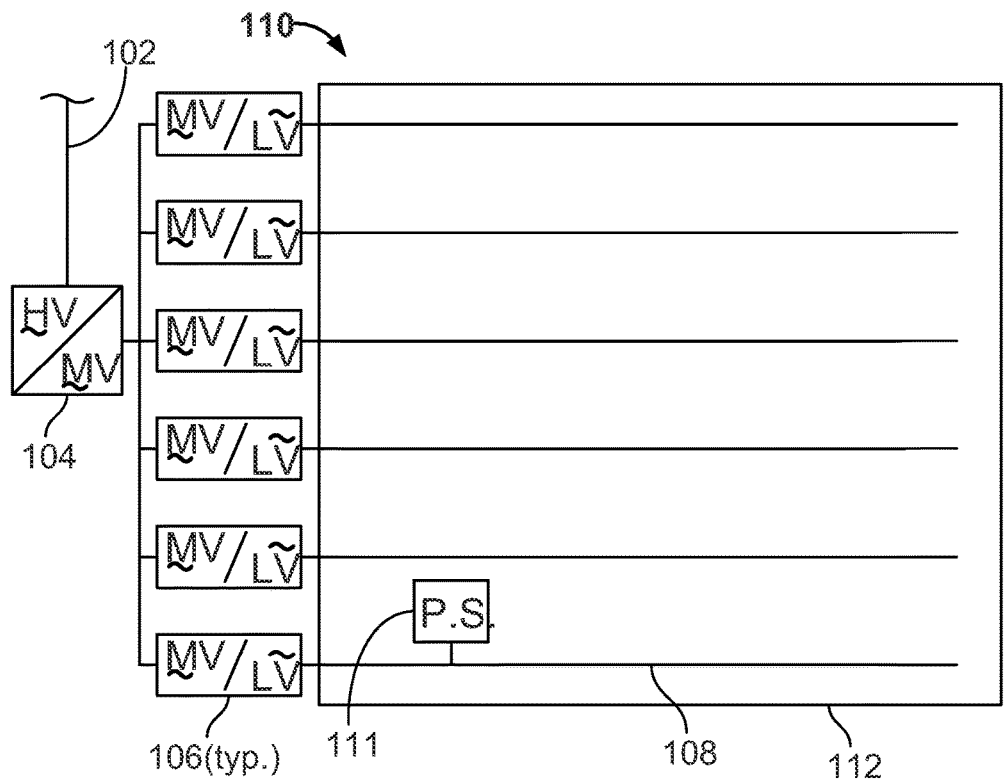
FIG. 1A is schematic diagram of a data center having a relatively small medium voltage power domain.

FIG. 1A is schematic diagram of a data center having a relatively small medium voltage power domain. In general, this figure shows relatively small medium voltage domains, and relatively large low-voltage domains that receive power form the medium voltage domains. As shown, a utility power line 102 enters a data center location 110 and services three separate high voltage-to-medium voltage transformers 104 (the number may vary as appropriate in other implementations). For example, each transformer 104 may be sized to receive and deliver between 25 MW and 50 MW of power, so that the data center building 112 may be served with 75 MW to 150 MW of electrical power. Each of the transformers 104 may in turn serve two separate medium voltage-to-low voltage transformers, of which transformer 106 is typical. Thus, for example, transformer 106 may be sized to handle 12 MW to 25 MW of power. In other examples, more or fewer high voltage-to-medium voltage transformers 104 may be provided, and more or fewer medium voltage-to-low voltage transformers 106 may be provided for each of the high voltage transformers 104. In general, such a system will be implemented in a symmetrical hierarchical manner, so that components are similarly sized across the system so that the system will be a naturally balanced system when it is in operation.

Each of the medium voltage-to-low voltage transformers 106 serves a particular bus duct, such as typical bus duct 108, that enters the building 112 and extends longitudinally through the building, such as at a height above the floor of the building at which the bus duct will not readily come into contact with workers or equipment. The bus ducts may also be insulated for safety purposes, and may otherwise be connected and operated in a manner for appropriate safe operation of the facility. Power supply 111 may connect to the bus duct 108 and is typical of hundreds, or thousands, or tens of thousands of power supplies that may be located throughout the building 112, and may serve power to rack-mounted computer systems within the building 112. For example, power supply 111 may take in 120V or 460V power and provide a number of direct current outputs that may be received by a computer motherboard for operation of components on the motherboard. The power supply 111 may be a smart power supply, in that it may be network-connected so as to report aspects of its operation to a central control system, and to receive and act upon control commands received from the central control system.

The power supply 111 may also be provided with a microprocessor for executing computer code stored at the power supply 111 that is directed toward the operation of the power supply 111. Such executable code may be updated automatically and remotely from the central control system, such that the central control may readily change the operability of particular one of the power supplies in a data center or all of the power supplies. The power supply 111 and other power supplies in the data center may be provided with an IP address or other identifier by which they can be individually addressed by such a central system over a data network. The power supply 111 may also be mated to a local battery that is sized to provide sufficient power for a defined period to the computer or computers served by the power supply 111 in the event that primary power from the utility fails. The power supply 111 may include various data interfaces for communicating with the battery, with the computer or computers that it serves, and with the central control system, such as over a local area network or wide area network.

Thus, FIG. 1A shows a system with three different relatively small medium voltage domains, and six relatively large low voltage domains, where each of the low voltage domains serves a large number of distinct power supplies and server systems. For example, bus bar 108 may serve a row of computers that includes two individual back-to-back paired rows that each include 50, 100, 150, or 200 separate vertical bays, where each bay includes 20, 30, 40, or 50 separate motherboards. In such a system, each motherboard may be associated with a single power supply (a 1-to-1 relationship), or a defined number of motherboards may be associated with and receive power from a particular power supply (an n-to-1 relationship). Therefore, while each medium voltage domain serves a large number of computers in this example, it is still only two rows of computers, so that a domain that needs additional power supply may not readily obtain that power from another domain that has excess power supply. Thus, in this example, power may be readily shared up and down bus duct 108, but may not be readily shared between one bus duct and any of the other bus ducts.

Figure 1B:
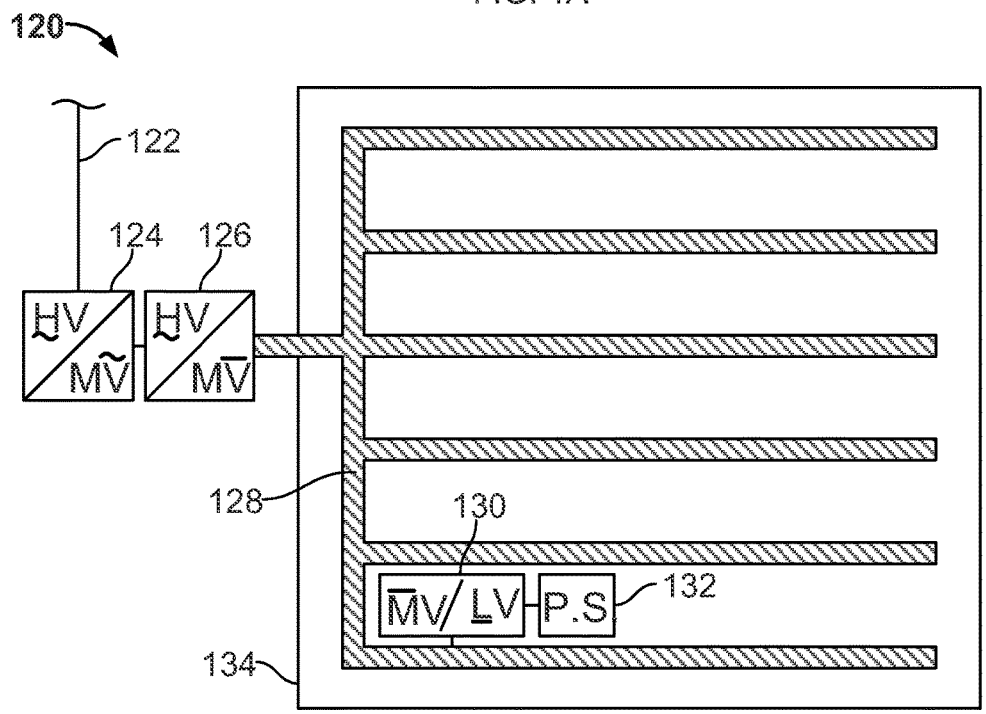
FIG. 1B is a schematic diagram of a data center having a large medium voltage power domain.

FIG. 1B is a schematic diagram of a data center having a large medium voltage power domain. This example shows a data center facility 120 that receives high voltage AC power from a utility line 122 and provides the power to a substation 124 that converts the power to medium voltage AC power. Optional rectifier 126 may then be provided to convert the medium voltage AC power to medium voltage DC power. In this example, the medium voltage DC power, or, where the rectifier 106 is not used, medium voltage AC power, is provided to a single medium voltage domain 128. Such a domain is shown schematically in this example by cross-hatching a schematic representations of a header and bus ducts that distribute power within data center building 134.

Again, the data center has six rows of bus ducts in this example, but the lowest pictured bus duct .is now connected to a medium voltage-to-low-voltage converter 130 (which may be a transformer where the medium voltage domain carries AC power) that in turn serves a power supply 132. The converter 130 may use solid-state componentry in order to achieve faster operation that may be needed for certain transformation processes and voltage and amperage levels. The converter may alternatively use ferromagnetic materials in a more traditional construction. The particular implementation will depend on the amount of power served, the costs involved, and other similar design considerations.

The converter 130 is typical and may be repeated for each rack in each row, in each bay in each rack, or in each nth rack or nth bay (or each nth rack of each mth bay). Again, the row may include dozens of bays along its length and the particular bus duct may serve two rows of racks that are in a back-to-back paired row configuration. The bust duct may extend down the middle of (but above) such paired row, so that taps off one side of the bus duct serve computer systems in a first row of the paired rows, and taps from the other side of the bus duct serve computer systems in the second row of the paired rows. The converter 130 in this example could, for example, serve low voltage power to all of the computer motherboards in a particular bay of the row of racks or in to all of the computers in a rack that has multiple bays. Where the converter 130 serves a single bay, that bay may include, for example, approximately 30 distinct motherboards that are mounted on shelves (and on trays) in the bay. Each such motherboard may be connected to its own power supply 132, so that converter 130 will provide electrical output for 30 different power supplies like power supply 132. Alternatively, each power supply like power supply 132 could serve three different computer systems, so that the converter 130 would serve 10 different power supplies that each serve three motherboards.

In certain implementations, each medium-voltage-to-low voltage converter may serve an entire row or a pair of rows of racks, such as by serving approximately 400, 500, or 600 KW of power. In such situations, the respective converters 130 may be located at floor level and at the end of a row or rows (e.g., two back-to-back rows that share a common warm-air plenum) of racks, with low voltage conduits running down along the respective rows to serve particular racks and particular servers or groups of servers.

Referring more generally to FIG. 1B then, the medium voltage domain 128 is larger than any of the medium voltage domains shown in FIG. 1A, and larger than any of the low-voltage domains shown in FIG. 1A. Similarly, the low-voltage domain in FIG. 1B, which covers up to several dozen power supplies, is significantly smaller than the typical low voltage domain in FIG. 1A, which may cover hundreds or thousands of power supplies. The result of having a larger medium voltage domain 128 is that power from one of the medium voltage bus ducts can transition naturally to another of the bus ducts when that power is needed. For example, one row of racks may be relatively underutilized for a time period, while another row of racks is more heavily utilized and requires additional electric power for that time. In the system of FIG. 1B, medium voltage power may flow freely from one bus duct that is underutilized to another that is over-utilized to react to such a change in demand in the system, without the need for active changes in components to the system (e.g., opening and closing of switches, or changing the operation of transformers serving different parts of the system). Similarly, the system may be designed to have smaller components, in that the ready sharing of power across the system may allow a designer to avoid having to oversize certain components of the system to make up for the fact that power, in a non-sharing system, cannot be readily obtained from other parts of the system.

Figure 2A:
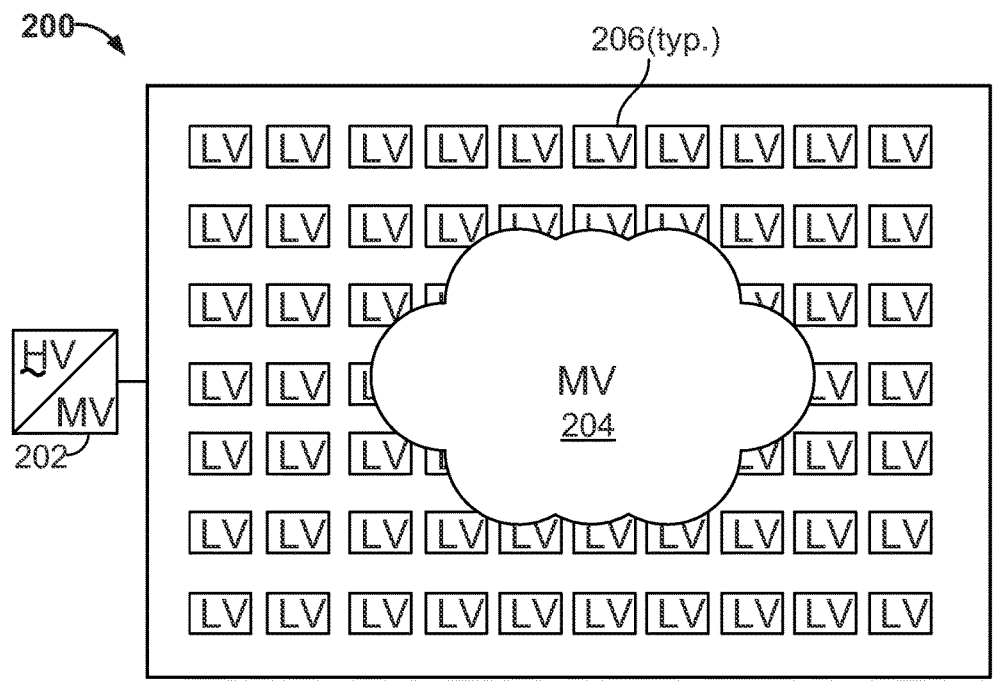
FIG. 2A shows discrete low voltage power domains in a computer data center.

FIG. 2A shows discrete low voltage power domains in a computer data center. In general, this figure represents a system similar to that shown in FIG. 1B, but represents the relation between the medium voltage domain and the various low-voltage domains in a different, more schematic, manner. In particular, a high voltage-to-medium voltage substation 202 may include one or more transformers to convert power from a high voltage level to a medium voltage level. In certain implementations, the power may also be rectified to DC power from AC power before it is distributed into the data center facility itself. The bulk of the area in the facility in this example is shown to be a medium voltage domain 204 that covers the entire area of the facility and permits power to freely pass around the domain at a medium voltage level, and is thus the same as the medium voltage domain 128 from FIG. 1B. In typical implementations, the medium voltage domain may be implemented by a series of parallel bus ducts that run parallel to each other, and parallel to or at a right angle to rows of computer serves in the computer data center. Also, the bus ducts may take other arrangements, such as grid-based arrangements.

In alternative embodiments, and depending upon the total electrical size on the facility, there may be multiple such medium voltage domains, such as where each domain serves a defined number of rows of racks in the data center, or some other defined area of the computer data center. For example, a large data center may have one, too, three, or four such medium voltage domains, or may have a number of medium voltage domains such that each domain serves two, three, four, or more rows (or pairs of rows) of racks.

FIG. 2A thus displays the relative large size of the medium voltage domain 204 and the small individual sizes of the low-voltage domains 206 both in terms of the relative amount of electric power that each handles in the system 200, and in the physical location or locations of each such domains. In particular, each of the low voltage domains are isolated from each other via their respective medium voltage-to-low voltage converters, but the variability within those low voltage domains is relatively minor because each low voltage domain may serve only several dozen computer systems.

The particular sizes of the different domains in these figures may be stated in a variety of manners, including by the absolute size of each medium voltage domain in a data center, the absolute size of the average low voltage domain in the data center, and the comparison of the size of the average medium voltage domain to the size of the average low voltage domain. (While in most implementations, each of the domains at a particular level would match in size each of the other domains, the average size is used here to permit some variability, or some outlier domains without departing from the spirit of what is discussed here.) In so describing such examples, the size of a domain may be expressed in W, KW, or MW; in number of computers, server systems, or motherboards (as explained above) in a domain; in terms of the number of sub-domains under a domain, in terms of the number of rows, racks, bays, or power supplies in a domain, and in other similar manners. Also, as described here and discussed above, the sizes are designed sizes, so that a data center may match the sizes or ratios discussed here, e.g., relating to number of computers in a domain, even if all of the computers are not currently installed. Rather, a medium voltage-to-low voltage transformer will be considered to serve 30 computers if it is mounted to a rack that holds 30 computers and is arranged to provide power to computers in the rack—even if the computers are not currently installed in the rack.

For example, the techniques discussed here enable the implementation of systems that have one or more relatively large medium voltage domains, one or more low voltage domains of small average size, or a small number of medium voltage domains as compared to the number of small voltage domains in a data center. Some examples of each such manner of describing such systems is provided here for illustration.

Relatively Large-Sized Medium Voltage Domains

One manner in which the size of a medium voltage domain may be described is in the number of distinct computers that each medium voltage domain serves (on average, for an overall computer data center). For example, as described here, an average medium voltage domain in a computer data center may serve 500-1000 computers, 1000-2000 computers, 2000-5000 computers, 5000-10000 computers, 10000-20000, or 20000-50000 computers.

A single medium voltage domain (averaged across a computer data center) may also serve more than a certain number of discrete rows of computers in a data center, such as more than 3, 6, 10, 15, 20, or 30 rows (but fewer than 100 rows). A single medium voltage domain may also serve more than a certain number of bays of computers, such as more than 100 bays, more than 500 bays, more than 1000 bays, more than 2000 bays, or more than 5000 bays (though fewer than 10000 bays). A single medium voltage domain may also serve more than a certain number of distinct computer power supplies, such as 500-1000 power supplies, 1000-2000 power supplies, 2000-5000 power supplies, 5000-10000 power supplies, 10000-20000, or 20000-50000 power supplies.

Alternatively, the size of medium voltage domains (either individually or as an average across a computer data center) can be expressed in the number of watts of power served by the particular domain or domains. As examples, a medium voltage domain may serve more than 3 MW, more than 5 MW, more than 10 MW, more than 30 MW, more than 50 MW, or more than 100 MW (though less than 250 MW).

Also, the size may be expressed in comparison to the amount of a datacenter that a particular medium voltage domain serves. For example, one common medium voltage domain can serve substantially an entire data center that is 10 MW-20 MW in size, or 20-50 MW in size, or 50-100 MW in size. One common medium voltage domain can likewise serve more than 25%, more than 33%, more than 50%, more than 66.7%, or more than 75% of the computing load in a computer data center of a size exceeding 30 MW, 50 MW, 75 MW, 100 MW, 150 MW, or 200 MW. In like manners, one medium voltage domain can serve all critical loads (and may additionally, but need not, serve all non-critical loads) in a computer data center according to the sizes and proportions discussed above in this paragraph.

Relatively Small-Sized Low Voltage Domains

In yet other manners of representing data centers like those discussed here, the data center can be defined according to the number of low voltage domains or the relative sizes (e.g., average size across all low voltage domains in the data center) of the low voltage domains. In the examples here, a particular or distinct low voltage domain is considered to be a portion of the system "downstream" from a medium voltage-to-low voltage transformer or converter. Referring to an absolute number of computers, counted as identified above, an average low voltage domain in a computer data center that contains more than 10,000 computers may include fewer than 10, 25, 50, 100, 250, or 500 computers. An average lower voltage domain in such a sized computer data center may serve fewer than fewer than 10, 25, 50, 100, 250, or 500 distinct power supplies (which convert the voltage to a voltage usable on a motherboard, and perhaps also convert the power from AC to DC, among other things). Similarly, an average low voltage domain in a computer data center that contains more than 10,000 computers can serve 1 bay, 3 bays or fewer, 12 bays or fewer, or 24 bays or fewer. Likewise, an average low voltage domain in such a computer data center can serve 1 rack, 3 racks or fewer, 6 racks or fewer, or 10 racks or fewer. In yet other examples of computer data centers having more than 10,000 computers, the average low voltage domain can serve a level of power equal to or less than about 500 KW, 250 KW, 100 KW, 50 KW, or 25 KW. Similarly, a computer data center of 50 MW to 150 MW size may include more than about 100, 200, 300, or 500 medium voltage-to-low voltage converters.

Large Medium Voltage Domains as Compared to Low Voltage Domains

In yet another expression of the computer data centers implementations discussed above, the organization of a computer data center may be expressed as a comparison of the relative size of one or more medium voltage domains that serve the computer data center as compared to the average size of low voltage domains that are served by those medium voltage domains. For example, one distinct medium voltage domain may serve more than 50, 100, 250, 500, or 1000 low medium voltage-to-low voltage converters, and thus that number of low voltage domains (though less than 100,000 converters). Additionally, the average medium voltage domain in a computer data center that has multiple medium voltage domains may likewise serve such numbers of medium voltage-to-low voltage converters.

As an alternative way of describing similar systems, a particular medium voltage domain may serve more than about 3 MW, 5 MW, 10 MW, 30 MW, 50 MW, or 100 MW (though less than 200 MW), and the average low voltage domain served by the medium voltage domain may serve less than about 500 KW, 250 KW, 100 KW, 50 KW, or 25 KW (where each of the combinations from these two lists may be applied). Similarly, the medium voltage domain may serve:

more than 3, 6, 10, 15, 20, or 30 rows (but fewer than 100 rows), where the average low voltage domain served by the medium voltage domain may have fewer than 2 rows;

more than 100, 500, 1000, 2000, or 5000 bays (though fewer than 10000 bays), where the average low voltage domain served by the medium voltage domain may have 1 bay, 3 bays or fewer, 12 bays or fewer, or 24 bays;

power supplies numbering 500-1000, 1000-2000, 2000-5000, 5000-10000, 10000-20000, or 20000-50000—while the average low voltage domain served by the medium voltage domain serves fewer than 10, 25, 50, 100, 250, or 500 distinct power supplies.

In another expression of such implementations, the average medium voltage domain in a computer data center greater than 50 MW may serve more than 30, 50, 100, or 200 times the electrical demand as the average low voltage domain in the computer data center. Thus, in these various ways, the need for extensive overbuilding of the electric supply infrastructure in a computer data center can be avoided, and the ability to move electric supply to areas of a computer data center that current need the power can be increased. As a result, the capital cost of a data center can be lowered significantly, while the effective capacity of the computer data center can be increased.

Figure 2B:
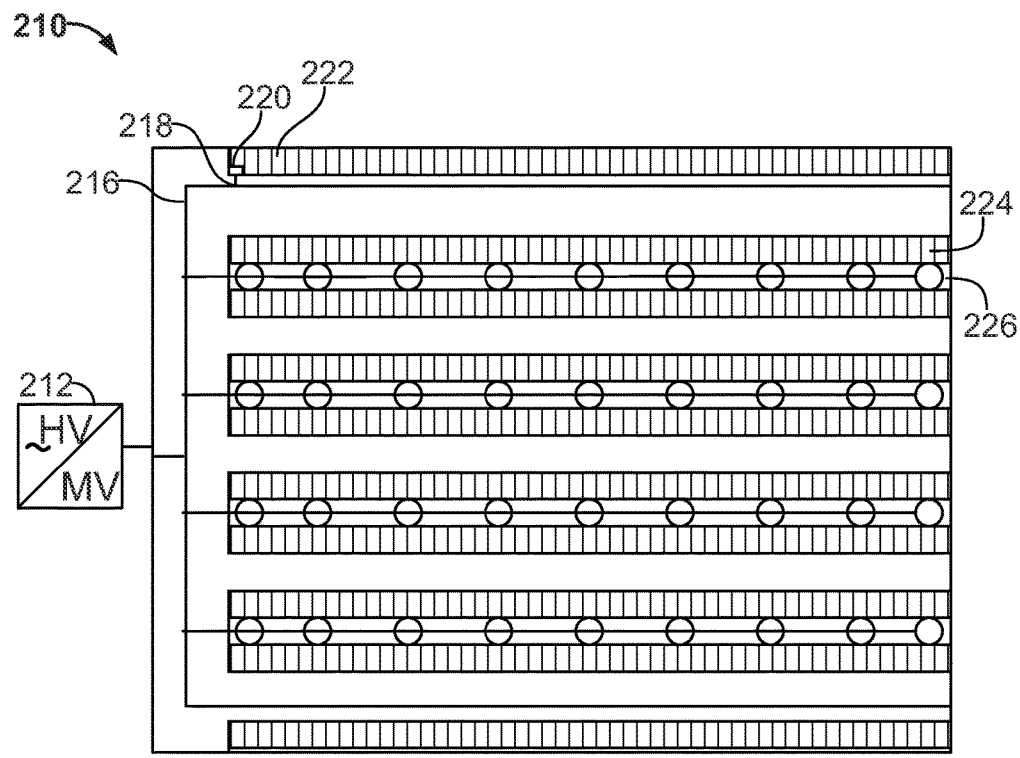
FIG. 2B is a schematic diagram of showing a power distribution system in relation to rows of racks in a computer data center.

FIG. 2B is a schematic diagram showing a power distribution system in relation to rows of racks in a computer data center. In general the system 210 shown here is similar to the systems shown in FIG. 1B and FIG. 2A, the location of the electric distribution system, and particular, bus ducts that are part of a medium voltage domain 216 are shown in relation to rows of computer racks that may sit below such bus ducts and may be served by power provided by such bus ducts. Thus, FIG. 2B provides more context to the views shown in the prior figures, so as to more readily show how the electrical distribution system relates positionally with the computer systems in their racks.

Referring more specifically to the figure, a high voltage-to-medium voltage transformer 212 is shown and may convert high voltage AC power to medium voltage AC or DC power. Such medium voltage power may then be provided to the medium voltage domain 216, which, as in the prior two figures, serves six different bus ducts that run longitudinally along the length of the data center building at six different locations. As shown in this example, however, paired rows of racks, such as row 224, are shown as running longitudinally beneath the bus ducts. For example, a warm air aisle 226 may be located immediately below the bus ducts and may receive warm air that enters from human-occupied double aisles, passes from the front to the back of servers such as in row 224, and then is passed through the warm air aisle 226 and circulated through cooling coils that may be located above the warm air aisle and below propeller fans that then circulate the air that has been cooled back into the human occupied workspace.

A single row of racks is shown against an external wall of the facility at the top of FIG. 2B, though in a normal implementation a warm air aisle may be located behind such racks so that air can be circulated through the racks from their front to the back. A first rack 222 has a medium-voltage-to-low voltage converter 220 attached to it, such as by the converter 220 being mounted on top of the rack 222. The converter 222 is served by an electrical conductor having a take-off of the first longitudinal run of the medium voltage domain 216. Thus, medium voltage power may be drawn out of that run and provided to the converter 220. The converter 220 may in turn output one or more low-voltage supplies, such as through a plurality of separate conductors that lead to one or more low-voltage power supplies for providing power to computers in the particular rack 222. Such an arrangement may be typical for, and substantially repeated for, each of the racks in that row and for each of the racks in all of the other rows in the data center, including row 224.

In this example, each row has approximately 20 separate bays for the racks, and the four middle bus ducts each serve two rows of racks that are arranged in a back-to-back arrangement, while the first and sixth bus ducts serve only a single row of racks. As a result, in this example, the medium voltage domain may serve 200 separate racks, and if each rack includes 30 separate computers, the medium voltage domain would serve 600 separate computer motherboards. This particular example is relatively small by the standards of a large commercial computer data center, which may have several dozen rows of racks and 100 or more bays in each row, and may thus include thousands or tens of thousands of computer motherboards that each need to receive electric power. Each such bay in that example may be assigned a medium-voltage-to-low voltage converter, such as in the form of a transformer, so that the data center includes hundreds or thousands of bay-sized low-voltage domains, and a single very large medium voltage domain or a small handful of medium voltage domains such as 1 to 10 medium voltage domains that serve together over 10,000 computer motherboards and 10,000 associated power supplies.

Figure 3:
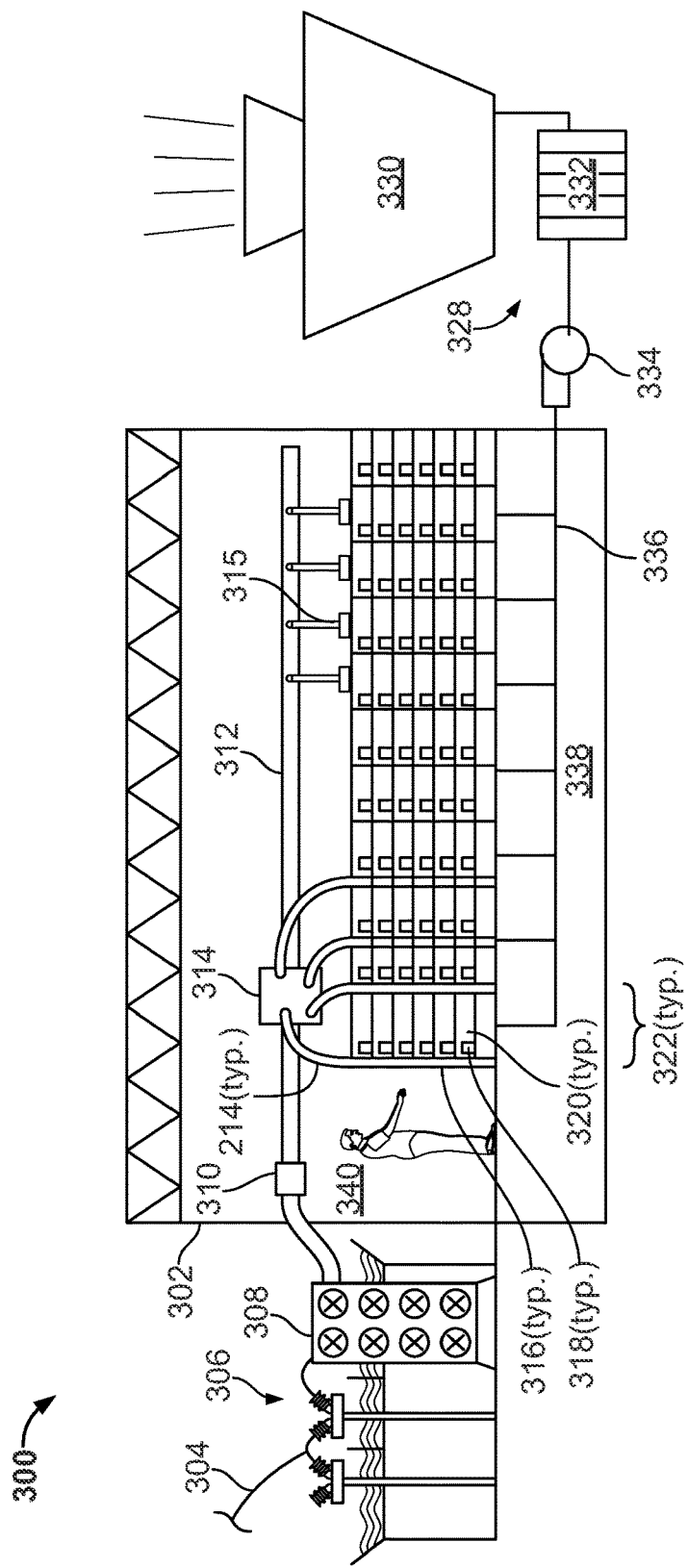
FIG. 3 is an elevation of a computer data center.

FIG. 3 is an elevation of a computer data center 300. In general, this figure shows better the layout of a bust duct 305 that may provide medium voltage power, in relation to particular computer racks and bays of computers within the racks in a computer data center. Again, the representation is largely schematic and it should be understood that an actual implementation would include additional components that have been omitted here for purposes of clarity (e.g., valving, switchgear, safety gear, insulation, control mechanisms and sensors, wiring, and ancillary equipment, such as lighting).

Referring now more specifically to particular components of the system 300, there is shown a data center building 302 outside of which is an electrical substation 306 that receives power from a utility line 304. The power received on utility line 304 is high-voltage AC power and may be provided to one or more components such as a transformer 308 and/or AC-to-DC rectifier that may convert the high voltage AC power to medium voltage AC, or DC power (where the DC power may require rectification and also conversion to lower voltage levels). The transformer 308 is then connected to one or more conductors that enter the building 302 and connect to an electrically conductive header 310. A plurality of bus ducts, with bus duct 312 being an example, may expand at a right angle from the header 310 and may run longitudinally along the length of the building 302 from one end to near a second and. In certain examples, 10, 15, 20, or more bus ducts may be provided. The number of bus ducts may be matched to the number of rows of computer racks, such as where each bus duct is matched to one row, or each bus duct is matched to a pair of rows of racks, where each pair shares its heated exhaust with a common cooling system.

A medium-voltage-to-low voltage converter 314 is shown adjacent to the bus duct 312 and provides power for separate bays in the pictured row of racks, such as power at 460, 220, or 110V. A first bay 320 is typical of the other bays along the row and is shown in more detail, showing individual trays with computers and power supplies in those trays. For example, power supply 318 is typical of power supplies that may be matched to each of the motherboards in the bay 320, and the power supply 318 may be plugged into a power strip 316 that runs vertically along a front corner of the bay 320.

A technician is shown standing in a human-occupied workspace 340, and may access the fronts of the computers in bay 320 by walking down an open cool air aisle and facing the bay 320. For example, the front face of the bay 320 may be open so that air may flow readily into the bay 320 and over the warm computing components stored there. Standing in front of the bay, the technician may also connect particular ones of the power supplies to power strip 316 and also connect network cabling and other such connections when installing a computer motherboard, or may disconnect the connections when removing the computer motherboard.

As an alternative implementation, though shown in the same figure for simplicity, each bay may alternatively include its own particular medium voltage-to-low voltage converter, as typified by medium voltage-to-low-voltage converter 315. For example, each bay may have a converter 315 mounted to the top of its frame that is connected to a power strip like power strip 316. A conductor for carrying medium voltage may be permanently attached to the top of the converter 315, or may be connected after the rack is put in place, and an opposite end of the conductor may be attached to the bus duct 312. Various known mechanisms may be used for executing such medium voltage connections and may include appropriate mechanisms for maintaining safety and ease of handling for technicians and electricians in the computer data center.

Also shown serving the data center building 302 is a mechanical system 328. In this example, the data center 300 is generally a closed-air system and obtains its cooling by way of water or other liquid that is circulated from outside the building 302 and into the building 302. Such circulated water may then be passed to cooling coils that are located, for example, at the top of a warm air aisle that is behind particular rows of racks and may use cooling coils to cool air that is passed from the computer racks. The water may be returned to outside the data center building 302 where the water may be cooled and re-circulated. For example, cooling of the water may occur in a cooling tower 330 which may be an open cooling tower, a closed cooling tower that takes the form of a radiator, or a hybrid cooling tower that can be operated in both modes. The cooling tower 330 circulates water through one side of a heat exchanger 332, and a separate water loop such as a condenser water loop may circulate water through another side of the heat exchanger 332. The condenser water loop may include a pump 334 that drives the water through a header or headers 336 in an under-floor area 338 of the data center building 302. The Header 336 may extend upward to cooling coils that are above the floor of the data center as discussed above. Although not shown here, additional components may be provided in the cooling system, such as return piping, additional valving, chillers for use during high cooling load periods, and similar peripherals and other components.

As shown, then, the mechanical system may be located largely at one end of the building 302 and under the main floor of the occupied area 340, while the electrical components can be located largely at an opposite end of the data center building 302 and be located well above the floor. Such positioning of the electrical equipment allows it to be largely out of the way of contact (at least for the medium voltage portion) with technicians and other workers in the building 302. The relative position of the electrical and mechanical components within the building (i.e., high and low) helps to separate the components so that they can be worked on separately and may have additional room for such work. Also, placing water-bearing components well away from and under electrical components may be helpful in terms of safety.

The relative lateral position of the electrical and mechanical systems (i.e., on different sides of the building 302) may enable easier outside access to the different systems and may also increase the speed and efficiency of the construction process for the data center 300, since mechanical and electrical contractors may generally avoid each other and not interfere with access or installation for the other. Of course, the mechanical systems will need electrical power, but such may be provided in various manners, such as by providing a transformer system separate from that for the computer systems, and passing power around the side of the building 302 to the opposite end where the mechanical system 328 is located.

Figure 4A:
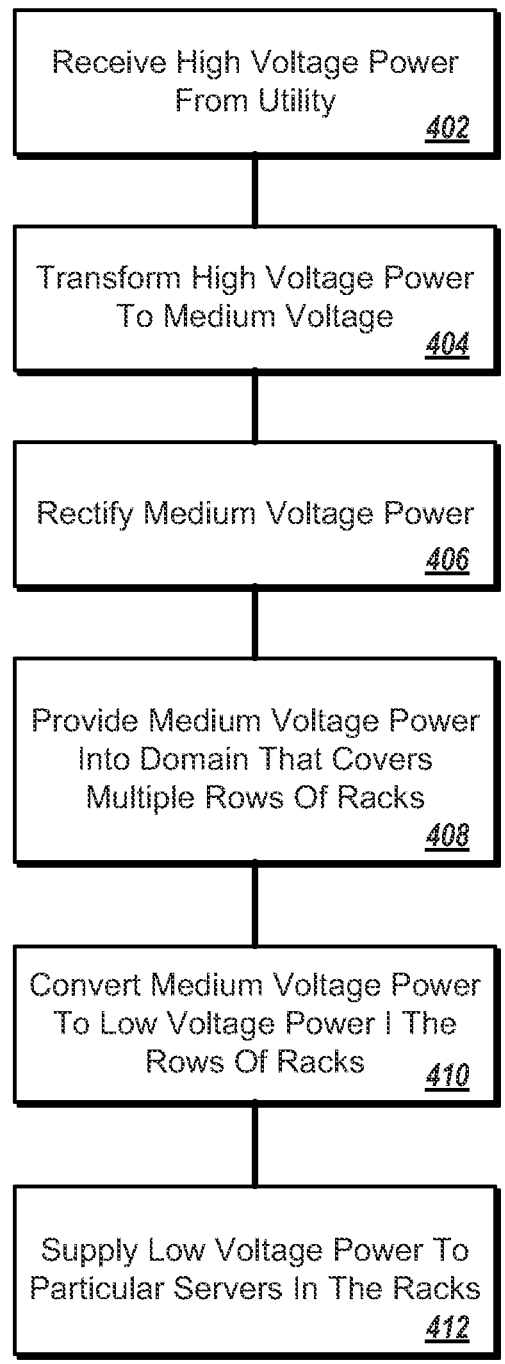
FIG. 4A is a flow chart of an example process for distributing power in a computer data center.

FIG. 4A is a flow chart of an example process for distributing power in a computer data center. In general, the process involves distributing the power into one or more large medium voltage domains within which the power can flow freely in response to demands in various parts of the particular domains, without the active assistance or blockage by components in the domain such as transformers or switches.

The process begins at box 402, where high voltage power is received from a utility. For example, in a standard manner, one or more high voltage power lines may enter a site of a computer data center from a utility power grid and may attach to various standard forms of equipment, such as in a sub-station, for receiving such form of power. The power may also be received from two different utilities or two different parts of the grid so as to provide back-up power protection, and the sub-station may be controlled to switch the source form which power is drawn by the data center facility.

At box 404, the high voltage power is transformed to medium voltage power. Such a step may occur by various standard mechanisms, and the particular approach chosen is not critical here. Power may also be split for use in different parts of the computer data center facility, such as by providing a portion of the power for use by the computer data center servers and related networking equipment, splitting off part of the power for operating mechanical systems like pumps, cooling towers, chillers and the like, and splitting off yet another portion of the power for ancillary purposes, such as providing lighting, and power to offices that are part of the data center facilities. Each such major power use may be isolated from the others.

At box 406, an optional step of rectifying the medium voltage power may be performed on the power that is to be provided to the computer data center servers and networking equipment. Such a step may occur when the computer data center is designed to use DC-level distribution inside the facility. Where the distribution is to be AC, and the AC-to-DC conversion is to occur, e.g., at the power supply level, no such rectification would normally be required. For example, a computer data center may depend on power supplies that serve one or a small handful of computers, of which there may be thousands in the computer data center, for power conditioning and other steps that might otherwise be performed on the main power via steps of rectifying and then rebuilding the AC power.

At box 408, the medium voltage power is provided into a large common domain that serves multiple rows of racks, or multiple paired rows of racks, such as 4, 6, 8, 10, 12, or 14 rows of racks, where each row includes more than 50, more than 74, or more than 100 boys, and each bay include more than 20, 30, 40, or 50 computer systems (defined by distinct motherboards). There may be one or more separate domains of such type in the overall facility, but each may be designed to be very large so as to provide a large level of power diversity across the domain (e.g., because excess available power can flow without impediment to an area in need of more power). The power may thus enter the actual computer data center building as medium voltage power via the one or more large domains (the sub-station having been distinct from the computer data center building for safety and other reasons in typical implementations).

At box 410, the medium voltage power is converted to low voltage power in each of the particular rows of racks. Thus, each row may have multiple medium-voltage-to-low voltage converters (which may include transformers where the power is still in AC form). For example, each rack or each bay may have such a converter correspond to it, such as by having the converter mounted to the top of the rack, or having the converter occupy a bay in the rack (e.g., with the converter in a top half of the bay and low voltage power supplies that supply the computers in the rack being located in a bottom half of the bay). As one example, the power may be stepped down from over 5 KV to 460V.

Such low voltage power may then be passed through insulated cords in a normal manner to one or more solid power strips that include multiple female receptacles for plugs from the various power supplies served by the respective power strips. The strips, for example, may run down the side of a bay at its front edge, where the power supplies are located with each of the trays/motherboards in the bay. Alternatively, where the power supplies are provided in their own dedicated bay, the power receptacles may be clustered in an area of the bay where all of the power supplies are mounted, such as on a shelf inside a cabinet that fills the bay. In such a situation, power supplies may be laid on the shelf and their cords may be plugged into the receptacles, and separate power leads may be attached from each power supply to one or more corresponding motherboards.

At box 412, low voltage power is supplied to particular servers in the racks. For example, where there is a 1-to-1 relationship between power supplies and motherboards, the low voltage power may be served to the computers directly, and additional power may be drawn through the medium voltage domain and through the medium-voltage-to-low voltage converter that serves the particular rack or bay. As power requirements change for particular rows (e.g., servers in one row receive orders to perform a large number of tasks, so that they occupy more of their cores and require additional current, and servers in another row sit relatively idle), the power supplies may draw on such power, and the power may be made readily available by flowing it naturally through the medium voltage domain so that it reaches the area with the most-immediate power demand.

In this manner, then, power may be made available and provided in a computer data center at locations where the power is needed, even where changes in power demand are large, occur quickly, and are distributed across far-reaching areas in the computer data center. For example, if a common medium voltage domain reaches across one-half the computer data center, power can readily flow across that half of the computer data center and quickly reach areas of high spot demand for electric power.

Figure 4B:
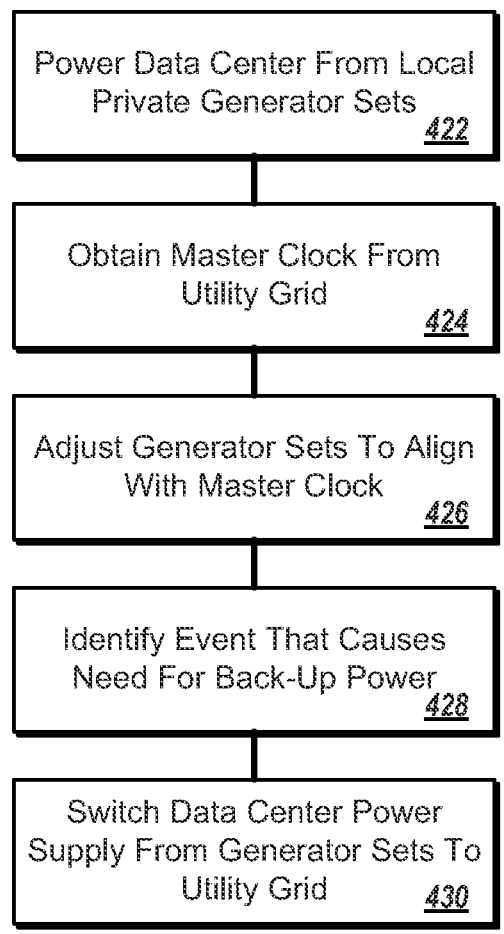
FIG. 4B is a flow chart of a process for providing back-up power to a computer data center.

FIG. 4B is a flow chart of a process for providing back-up power to a computer data center. The process in the figure here generally involves the use of generator sets as primary power and utility grid power as back-up power in a coordinated manner.

The process begins at box 422, where a computer data center is powered from a farm of generator sets that are operated local to the data center by the same operator that runs the computer data center. The generator sets may be arranged to each provide power to a common power bus or similar structure in the computer data center. The generator sets may be operated for extended periods of time (e.g., hours or days or more) to provide all of the power needs for the data center. The power supplied by the generator sets may be uniform phase-matched AC power that enters the data center, or may be rectified to DC power before it enters the data center and is distributed therein.

At box 424, the system obtains the master clock that defines the AC power phasing for the utility grid. Such a step may permit a controller that operates with the system to then adjust the generator sets, at box 426, to align with the master clock. The actions represented by boxes 424 and 426 may be repeated frequently over time to ensure that changes in the master clock are reflected in the continuing operation of the generator sets, and that the generator sets stay constantly in substantial phase alignment with the utility grid power.

After operating in this manner for some undefined time period, the system may identify that an event has occurred that causes a need for back-up power. For example, the generator sets may be run on an operating schedule that requires that they be rested every X hours or Y days. Similarly, the generator sets may have a maintenance schedule that requires them to be taken out of service every X days or Y months (e.g., to change filters and fluids and to test system components). Alternatively, fuel to the generator sets may be interrupted or one or more generator sets may otherwise fail so that the capacity of the combined generator sets falls below the expected near-term demand for the computer data center. Such events may be identified by a controller for the system, such as by a maintenance or operational calendar monitored by the controller or a system with which the controller communicates, or by monitoring the operation of particular generator sets or the electric supply provided from a generator farm to the computer data center. Various other mechanisms may also be used to identify when power supply needs to switch from the generators sets to the utility grid.

At box 430, the system switches the power supplied to the computer data center from the generator sets to the utility grid. Such switchover may be relatively smooth because the generator sets have been maintained in phase with the grid while they have been operating. The switch-over may occur, for example by coordinated switching of components such as switches 510 and 524 in FIG. 5.

After some time, the generator sets may take over supplying power to the computer data center. However, because they are the primary power provider in this situation, the switch-over would generally occur because they are available, and not because of some sudden failure in power from the utility grid. Thus, in such a situation, a controller may spin up the generator sets, align them in phase with the utility grid power, and cause them to be connected to deliver power to the computer data center, and cause the power to stop being delivered from the utility grid.

In another implementation, the generator sets may be used as back-up power, and in order to allow them to be used quickly upon a need for back-up power (e.g., a sudden failure of grid power) and to have the power joined together easily to serve a common very large electrical domain, the generator sets may have their AC-generated power converted to DC power before being combined, or may generate DC power directly. As discussed here, a generator set may include a co-gen facility, a turbine, an engine-generator combination (e.g., powered by natural gas or diesel fuel), a bank of solar cells, a bank of fuel cells, and the like).

Thus, by these methods, back-up power may be supplied to a computer data center when a need arises to transition out of primary power. The transition can occur quickly based on, in certain examples, keeping the primary source in phase alignment with a secondary, back-up power source that is available and being generated but not being used by the computer data center, or that can be brought up-to-speed quickly without requiring phase alignment of the sub-sources for the back-up power. Such a system may also be combined with a large medium voltage power domain for distributing the generated or obtained power to loads in the data center in the manners discussed above and below.

Figure 5:
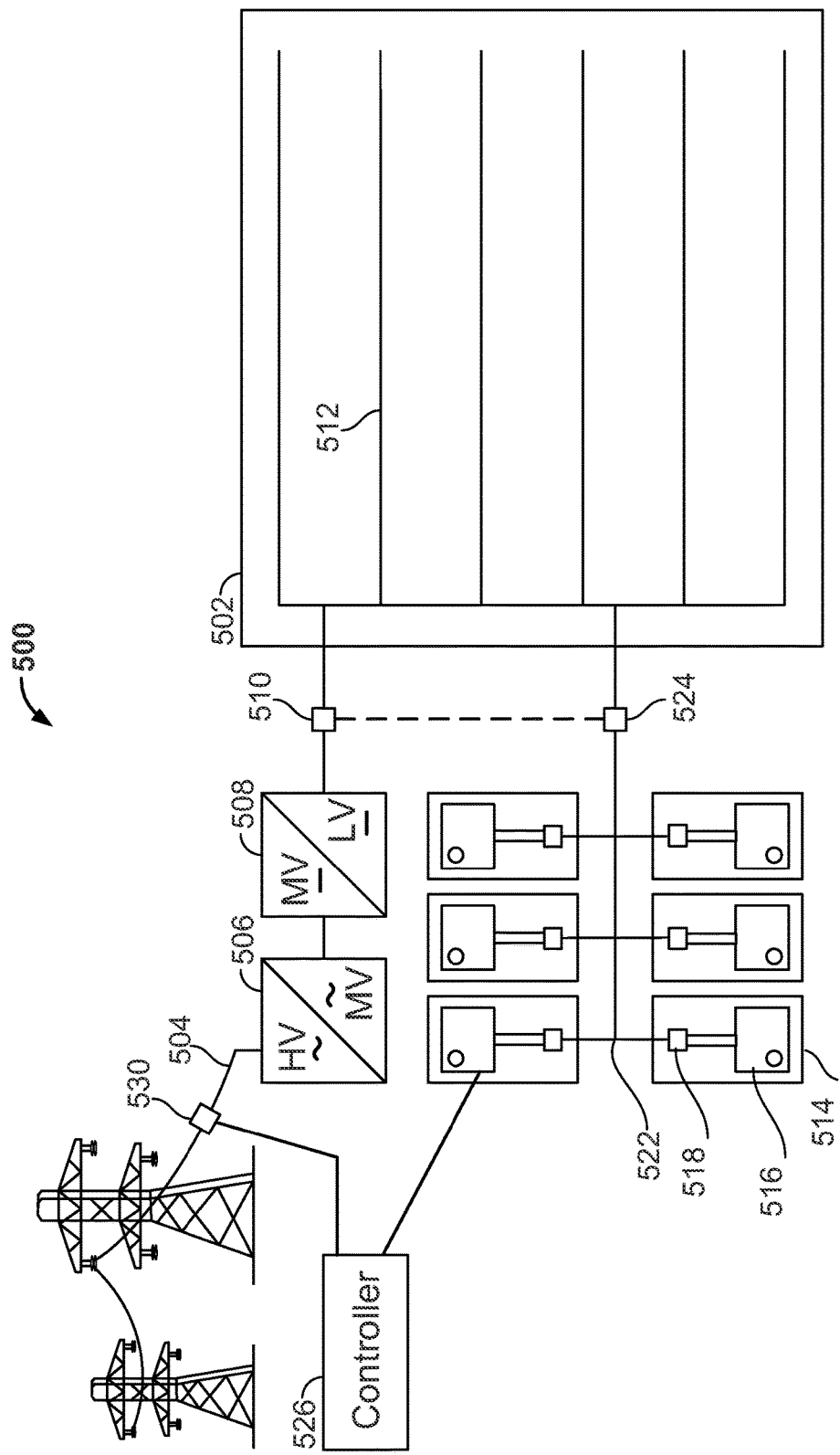
FIG. 5 is a schematic diagram of an electrical generation and distribution system for a computer data center.

FIG. 5 is a schematic diagram of an electrical generation and distribution system for a computer data center. In this figure, generator sets are used to provide primary power (rather than back-up power), and as they operate, they are maintained in phase with the prevailing phase of power on the local electric power grid. As a result, when the grid is to provide back-up power (e.g., a generator set fails, so that the remaining generator sets cannot supply all necessary power), a switch can be made quickly to utility power without introducing harmful transient effects into the system. (In this example, they may also have their power rectified or may produce DC power so that such coordination with the grid's power phase is not needed). By providing power in a phase-coordinated manner from a large number of generator sets (either by aligning the phase of all the sets or by converting AC power to DC before joining it together), such a system may supply on-site power to a large MV domain like those discussed above.

In the figure, there is shown a power distribution system 500 serving a computer data center 502 with electric power. Power enters the system via one or more high voltage power lines 104 from a public utility grid. In certain implementations, utility power may be received from two different sources, so as to provide diversity in the power supply for the computer data center 502.

The lines 504 connect electrically to one or more substations 506 that may include transformers or other converters that convert the power from a high voltage AC to medium voltage AC. As used herein, high voltage power is above about 35 KV, while medium voltage extends from about 5 KV to about 35 KV, and low voltage is about 1000 Volts and below, such as 480 Volts.

In certain implementations, a rectifier 508 may be provided to convert medium voltage AC power to medium voltage DC power, where distribution throughout the computer data center 502 is to be via DC distribution components. Alternatively, the rectifier 508 may be omitted, and AC power may be provided into the data center 502. In such an implementation, a conversion from AC to DC may occur at power supplies for particular computers or groups of computer in the computer data center 502 (e.g., at the rack level).

The power is then fed through a breaker or other form of switch 510 to a distribution bus 512 inside the computer data center. In certain implementations, transformers for converting high voltage to medium voltage can also be inside the computer data center 502, as may transformers or other converters for converting medium voltage to low voltage power.

A common medium voltage domain may span across a substantial portion of the computer data center 502. For example, each of the branches shown for distribution bus 512 may carry medium voltage power, such as in the form of bus bars that are appropriately physically located high above a workspace in the computer data center 502, and above computer racks filled with servers in the computer data center 502. The branches may be a single medium-voltage domain, in that power may be able to flow freely between and among the branches because no active components, such as transformers or converter, are located to block such free flow of the current. Medium-voltage-to-low voltage converters (not shown) may, in such a situation, connect to bus bars that are located above respective rows of computer racks in the computer data center 502, and may connect on their low voltage sides to power strips that extend down along the front faces of respective computer racks that they serve with electric power. The power strips may then be plugged into by cords from particular servers on trays in the racks.

A back-up power system is provided separately from the utility power supply in the electric distribution system 500. The back-up power system comprises a plurality of generator sets, typified by generator set 514. In general, a generator set 514 includes an engine 516 that typically operates on a fuel like diesel fuel, gasoline, or natural gas. The generator sets may take other forms also, such as solar or fuel cells, and the like.

The power from the generator sets may be provided to the computer data center through a breaker or other form of switch 524. As indicated by a dashed line, the switch 510 and the switch 524 may be interconnected by an interlock 527 so that power is provided to the computer data center 502 from only the primary source (the utility grid in this example) or only the back-up source (the generator sets in this example) at any particular moment. Thus, the interlock 527 causes the switches to be controlled in a coordinated manner to switch from a first main power source to a second main power source, and may be switched back when the first main power source is again available. For example, as one switch 510, 524 is switched so that its associated source of power delivers power, the other switch 510, 524 may be switched so that its source no longer delivers power, as a result of the action of the interlock 527.

A controller 526 operates to activate the generator sets when back-up power is needed by the system. Though the controller 526 can be attached to a single generator set, or it may be attached to each of the generator sets and may control them in unison with each other, such as to align the phase of the AC electricity that they are producing and to cause them to power up and shut down when appropriate. For example, one controller may independently control each of the generator sets, or may communicate with other controllers that each control one or more of the generator sets. Thus, controllers may be arranged in a hierarchical arrangement by which a master controller communicates with, and controls, multiple slave controllers, and receives reports from the slave controllers about the status of their respective generator set or sets.

The controller 526 may also monitor, or may be in communication with a system that monitors, the status of the utility power. For example, the controller 526 may identify when the utility power has failed, is about to fail or be insufficient (e.g., via the utility sending a signal to the controller 526 instructing the controller 526 to switch to back-up power, such as during a peak energy use period), or is in the process of failing. Similarly, the controller 526 or a system that controls controller 526 may control other components of the system 500 in a coordinated manner, such as by controlling the interlock 527 in coordination with powering up the generator sets so that when the system 500 is ready to supply power from the generator sets, the switches 510, 524 are switched in a proper and timely coordinated manner.

Referring again to the generator sets, generator set 514 is typical and is connected to an AC power bus 522 directly from its generator 518. In such a case, the controller 526 does need to work to align the AC phases of the power generated by the various generator sets (as may occur where asynchronous operation of the various generators relative to each other may be desired) so that it can be combined properly on the AC power bus 522. (However, direct DC generation may be used so that the bus is a DC bus, and generator-to-generator creation of DC power may also be employed). Also, because AC power is used here, the phasing needs to be aligned if there is a live cut-over between the utility grid power system and the generator sets. Where the generator sets are used to provide back-up power, such a cut over may take minutes because of the need to start up the generator sets and to then get them in phase alignment.

Thus, the operation of the system involves generator sets that may be used as primary power sources and the utility grid may act as a back-up source. Specifically, the controller 526 may use a monitor 530 to identify the phase, or clock, for the utility grid and may adjust the generator sets as they are delivering primary power so that they operate in phase with the grid power, even though the computer data center 502 is not at the time receiving power from the utility grid. When a need arises to switch from the generator sets to the grid (e.g., because a system operating the controller 526 has determined that such a change would be economically feasible or because a generator set has failed and the generator sets cannot provide sufficient power to meet the current or expected demand of the computer data center 502), the switch may be mad readily by coordinating the change in switches 510 and 524.

Figure 6:
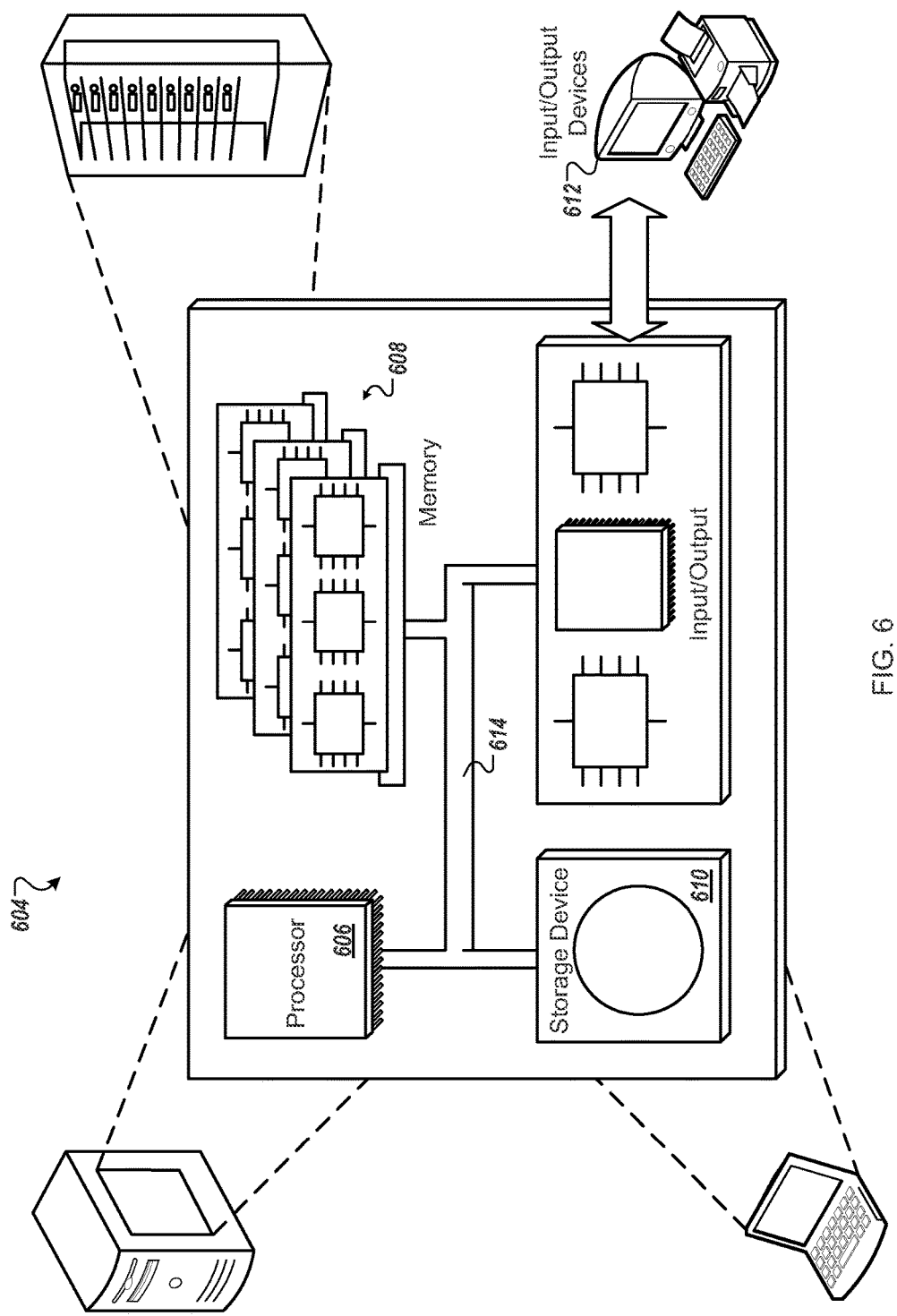
FIG. 6 shows a general computer system that can provide for management and control of electrical energy delivery to a data center.

FIG. 6 shows a general computer system 600 that can provide for management and control of electrical energy delivery to a data center. The system 600 may, for example, control the switching of power and the delivery through different domains in the system, such as in the manner discussed for FIG. 4 above. The system 600 may exemplify computers located at each power supply in a system, computers that communicate with and control the power used by and the activities of such power supplies, and other computers that communicate via a network, including a central computer system that controls and coordinates power distribution throughout a computer data center facility or facilities and between different computer data center facilities. The system 600 may be implemented in various forms of digital computers, including computerized defibrillators, laptops, personal digital assistants, tablets, and other appropriate computers. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having an LCD (liquid crystal display) or LED display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Many other implementations other than those described may be employed, and may be encompassed by the following claims.

What is claimed is:

1. A method of providing power to computer systems in a computer data center, the method comprising:
   receiving, at a computer data center, high-voltage power at above 35 kilovolts (kV) from one or more electric utility distribution systems;
   transforming, at the computer data center, the high-voltage power to medium-voltage power to between 15 kV and 35 kV with one or more high-voltage to medium-voltage converters; and
   distributing the medium voltage power through a single common medium voltage domain that serves an entire data center that is between about 10 megawatts to 100 megawatts in size, the data center comprising a plurality of medium voltage-to-low voltage converters that are located in rows of computer racks in the computer data center, the single common medium voltage domain comprising an area of an electrical distribution system in the computer data center having a common voltage level and flow of electric power across the domain without blocking by active circuit elements between a medium-voltage output of the one or more high-voltage to medium-voltage converters and a medium voltage input of the plurality of medium voltage-to-low voltage converters,
   wherein each rack in a row of racks has a medium voltage-to-low voltage converter mounted to the rack, each medium voltage-to-low voltage converter configured to distribute low voltage power through a low voltage domain that is electrically isolated from other low voltage domains by the medium voltage-to-low voltage converter, each low voltage domain serving one or more computer racks in the computer data center that comprises less than 500 kilowatts of power, and
   the single common medium voltage domain comprises a plurality of medium voltage bus bars arranged in a plurality of insulated bus ducts that are positioned within a human-occupiable workspace of the data center and vertically between paired rows of computer racks and a ceiling of the human-occupiable workspace, each bus duct extending parallel to the paired rows of racks and above a warm air aisle that is formed between the paired row of computer racks and configured to physically isolate a respective medium voltage bus bar from the human-occupiable workspace.

2. The method of claim 1, wherein the medium voltage-to-low voltage converters are mounted at a particular location within each rack, the particular location comprising at least one of:
   at a top of each rack; or
   at a particular bay in each row of each rack.

3. The method of claim 1, wherein one or more bays in a first row of racks is dedicated to medium voltage-to-low voltage converters that serve computer servers in the first row of racks.

4. The method of claim 1, wherein the medium voltage-to-low voltage converters have low voltage outputs at below 1000 volts that are connected to power strips that run vertically along frames of particular racks in the rows of racks.

5. The method of claim 1, wherein each medium-voltage-to-low-voltage converter is located between a first end and a second end of a respective row of computers that the medium-voltage-to-low-voltage converter serves.

6. The method of claim 5, wherein each medium-voltage-to-low voltage converter is located above a rack that the respective medium-voltage-to-low-voltage converter serves.

7. The method of claim 1, wherein the average medium-voltage-to-low-voltage converter served by the single common medium voltage domain delivers less than one megawatt at design capacity.

8. The method of claim 1, wherein the medium voltage domain delivers more than thirty megawatts at design capacity.

9. The method of claim 8, wherein an average medium voltage-to-low voltage converter of the medium voltage-to-low voltage converters served by the medium voltage domain delivers less than one megawatt at design capacity.

10. The method of claim 1, wherein the medium voltage domain carries alternating current and the medium voltage-to-low voltage converters comprise transformers.

11. The method of claim 1, wherein the medium voltage domain carries direct current.

12. A system for providing power to computer systems in a computer data center, the system comprising:
   one or more high voltage-to-medium voltage converters positioned at a computer data center and arranged to convert high-voltage power at above 35 kilovolts (kV) from one or more electric utility distribution systems to medium-voltage power between 15 kV and 35 kV;
   a single medium voltage domain that serves the entire computer data center that is between about 10 megawatts to 100 megawatts in size, the single common medium voltage domain comprising an area of an electrical distribution system in the computer data center having a common voltage level and flow of electric power across the domain without blocking by active circuit elements; and a plurality of medium voltage-to-low voltage converters arranged to receive electric power from the single medium voltage domain and to provide low-voltage electric power at below 1000 volts to a plurality of computing components in the computer data center, wherein the plurality of medium voltage-to-low voltage converters are located in rows of computer racks in the computer data center, wherein each rack in a first row of racks has a medium voltage-to-low voltage converter mounted to the rack, each medium voltage-to-low voltage converter configured to distribute low voltage power through a low voltage domain that is electrically isolated from other low voltage domains by the medium voltage-to-low voltage converter, each low voltage domain serving one or more computer racks in the computer data center that comprises less than 500 kilowatts of power, the single medium voltage domain is electrically defined between a medium-voltage output of the one or more high voltage-to-medium-voltage converters and a medium voltage input of the plurality of medium voltage-to-low voltage converters, and the single medium voltage domain comprises a plurality of medium voltage bus bars arranged in a plurality of insulated bus ducts that are positioned within a human-occupiable workspace of the data center and vertically between paired rows of computer racks and a ceiling of the human-occupiable workspace, each bus duct extending parallel to the paired rows of racks and above a warm air aisle that is formed between the paired row of computer racks, each bus bar being electrically coupled to the plurality of medium voltage-to-low voltage converters and configured to physically isolate a respective medium voltage bus bar from the human-occupiable workspace.

13. The system of claim 12, wherein the medium voltage-to-low voltage converters are mounted at a particular location within each rack, the particular location comprising at least one of:
   at a top of each rack; or
   at a particular bay in each row of each rack.

14. The system of claim 12, wherein one or more bays in a first row of racks is dedicated to medium voltage-to-low voltage converters that serve computer servers in the first row of racks.

15. The system of claim 12, wherein the medium voltage-to-low voltage converters have low voltage outputs that are connected to power strips that run vertically along frames of particular racks in the rows of racks.

16. The system of claim 12, wherein each medium-voltage-to-low-voltage converter is located between a first end and a second end of a respective row of computers that the medium-voltage-to-low-voltage converter serves.

17. The system of claim 16, wherein each medium-voltage-to-low voltage converter is located above a rack that the respective medium-voltage-to-low-voltage converter serves.

18. The system of claim 12, wherein the average medium-voltage-to-low-voltage converter served by the single common medium voltage domain delivers less than one megawatt at design capacity.

19. The system of claim 12, wherein the medium voltage domain delivers more than thirty megawatts at design capacity.

20. The system of claim 19, wherein an average medium voltage-to-low voltage converter of the medium voltage-to-low voltage converters served by the medium voltage domain delivers less than one megawatt at design capacity.

21. The system of claim 12, wherein the medium voltage domain carries alternating current and the medium voltage-to-low voltage converters comprise transformers.

22. The system of claim 12, wherein the medium voltage domain carries direct current.

23. A method of providing power to computer systems in a computer data center, the method comprising:
   receiving high-voltage power at above 35 kilovolts (kV) from one or more electric utility distribution systems;
   transforming the high-voltage power to medium voltage power at between about 15 kV and about 35 kV; and
   distributing the medium voltage power through a common medium voltage domain that serves an entire data center that is between about 10 megawatts to 100 megawatts in size, the data center comprising a plurality of medium voltage-to-low voltage converters that are located in rows of computer racks in the computer data center, wherein the medium voltage domain carries direct current, wherein the common medium voltage domain comprises an area of electrical distribution, that is between a converter that transforms the high-voltage power to medium voltage power and the plurality of medium voltage-to-low voltage converters, and that serves all of the medium voltage power to the plurality of medium voltage-to-low voltage converters through a single medium voltage electrical circuit that is independent of one or more active electrical components that prevents the medium voltage power from flowing from a first portion of the area to a second portion of the area, and the common medium voltage domain comprises a plurality of medium voltage bus bars arranged in a plurality of insulated bus ducts that are positioned within a human-occupiable workspace of the data center and vertically between paired rows of computer racks and a ceiling of the human-occupiable workspace, each bus duct extending parallel to the paired rows of racks and above a warm air aisle that is formed between the paired row of computer racks and configured to physically isolate a respective medium voltage bus bar from the human-occupiable workspace, each bus bar being electrically coupled to the plurality of medium voltage-to-low voltage converters, each medium voltage-to-low voltage converter configured to distribute low voltage power through a low voltage domain that is electrically isolated from other low voltage domains by the medium voltage-to-low voltage converter, each low voltage domain serving one or more computer racks in the computer data center that comprises less than 500 kilowatts of power.

24. A system for providing power to computer systems in a computer data center, the system comprising:
   one or more converters at the computer data center that is arranged to convert high-voltage power at above 35 kilovolts (kV) from one or more electric utility distribution systems to direct current (DC) medium-voltage power at between about 15 kV and about 35 kV;
   a DC medium voltage domain that serves the entire computer data center that is between about 10 megawatts to 100 megawatts in size; and
   a plurality of medium voltage-to-low voltage converters positioned within the computer data center and arranged to receive electric power from the medium voltage domain and to provide low-voltage DC electrical power at below 1000 volts to a plurality of computing components in the computer data center, wherein the plurality of medium voltage-to-low voltage converters are located in rows of computer racks in the computer data center, wherein the DC medium voltage domain comprises an area of electrical distribution that serves all of the DC medium voltage power to the plurality of medium voltage-to-low voltage converters through a single medium voltage electrical circuit that is independent of one or more active electrical components that prevents the medium voltage power from flowing from a first portion of the area to a second portion of the area, and the DC medium voltage domain is electrically defined between the one or more converters and the plurality of medium voltage-to-low voltage converters, each medium voltage-to-low voltage converter configured to distribute low voltage power through a low voltage domain that is electrically isolated from other low voltage domains by the medium voltage-to-low voltage converter, each low voltage domain serving one or more computer racks in the computer data center that comprises less than 500 kilowatts of power, and the DC medium voltage domain comprises a plurality of medium voltage bus bars arranged in a plurality of insulated bus ducts that are positioned within a human-occupiable workspace of the data center and vertically between paired rows of computer racks and a ceiling of the human-occupiable workspace, each bus duct extending parallel to the paired rows of racks and above a warm air aisle that is formed between the paired row of computer racks and configured to physically isolate a respective medium voltage bus bar from the human-occupiable workspace, each bus bar being electrically coupled to the plurality of medium voltage-to-low voltage converters.

* * * * *

UNITED STATES PATENT AND TRADEMARK OFFICE
CERTIFICATE OF CORRECTION

| | | |
|---|---|---|
| PATENT NO. | : 10,211,630 B1 | Page 1 of 1 |
| APPLICATION NO. | : 14/040381 | |
| DATED | : February 19, 2019 | |
| INVENTOR(S) | : Clidaras et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this
Twentieth Day of December, 2022

*Katherine Kelly Vidal*

Katherine Kelly Vidal
*Director of the United States Patent and Trademark Office*